United States Patent
Willis

Patent Number: 5,992,078
Date of Patent: Nov. 30, 1999

[54] ANCHOR STORAGE SYSTEM

[76] Inventor: Leon M. Willis, 1619-184th Ave. NE., Bellevue, Wash. 98008

[21] Appl. No.: 08/963,957

[22] Filed: Nov. 4, 1997

[51] Int. Cl.$^6$ .................................................. A01M 31/06
[52] U.S. Cl. ..................................................... 43/2
[58] Field of Search ................................. 43/2, 3

[56] References Cited

U.S. PATENT DOCUMENTS

| | | | |
|---|---|---|---|
| 1,923,442 | 8/1933 | Kilgore | 43/3 |
| 1,951,429 | 3/1934 | Massie | 43/3 |
| 2,268,963 | 1/1942 | Riddell | 43/3 |
| 2,622,360 | 12/1952 | Bertram | 43/3 |
| 2,709,866 | 6/1955 | Stumvoll | 43/3 |
| 2,984,974 | 5/1961 | Bell | 43/3 |
| 3,055,134 | 9/1962 | Archer | 43/3 |
| 3,074,195 | 1/1963 | Vanderpool | 43/3 |
| 3,149,433 | 9/1964 | Hagen | 43/3 |
| 3,704,538 | 12/1972 | Gagnon | 43/3 |
| 3,733,733 | 5/1973 | Ruter | 43/3 |
| 3,834,054 | 9/1974 | Gentry | 43/3 |
| 3,930,328 | 1/1976 | Knuth | 43/3 |
| 4,757,630 | 7/1988 | Tolberg | 43/3 |
| 4,827,653 | 5/1989 | Sewell | 43/3 |

*Primary Examiner*—Thomas Price
*Assistant Examiner*—Son T. Nguyen
*Attorney, Agent, or Firm*—Richard Gray

[57] ABSTRACT

A wildfowl decoy has an improved anchor storage system including a cavity within the body of the waterfowl decoy for receiving and storing an anchor. Vertical walls and a recessed area within the cavity prevent horizontal dislodgment of the anchor. A retaining mechanism engages the anchor to prevent vertical movement of the anchor thus preventing an accidental removal. The anchor may be easily removed when intentional removal is desired.

1 Claim, 3 Drawing Sheets

ANCHOR STORAGE SYSTEM

BACKGROUND OF THE INVENTION

This invention generally relates to devices adapted to be anchored and more specifically to wildfowl decoys having improved anchor weight storage.

Wildfowl decoys have by tradition, utilized various methods to store an anchor weight when not in use. Most of these systems rely on wrapping an anchor line around the decoy body or around the keel of the decoy, to store the line. An attempt is then made to secure the anchor in some manner. One method wraps the anchor line around the body or keel of the decoy, then wraps the last portion of the line around the neck of the decoy leaving the anchor free to swing or bang against the decoy body. Another system utilizes a rectangular shaped strip of lead which is bent into a "C" shape and wrapped around the neck of the decoy after the line is wrapped around the body or keel. A third method depends upon an oval shaped anchor weight of such size that it may be slipped over the head of the decoy and left to swing upon the neck after the line is wrapped around the body or keel. A fourth and somewhat similar method utilizes a saucer-shaped weight to which a loop shaped wire is attached that may be slipped over the head of the decoy. It is similarly left to swing or hang on the neck of the decoy after the line is wrapped around the body or keel.

All these systems share several common faults. They allow the paint on the decoy to be damaged by the anchor banging against the decoy because the anchor has not been stored in a secure manner. In addition, the decoy surface itself may be damaged, and will require repair. These systems allow for the decoy lines to become tangled with each other when the anchors become dislodged. Untangling decoy lines is frustrating and time consuming. When anchors are dislodged in freezing weather the decoy lines can freeze together making it difficult to untangle them, especially while wearing bulky gloves. Frozen lines are subject to fraying and breakage which may result in lost decoys, and lost hunting time while attempting to retrieve the errant decoys. It is obviously desirable to contain the decoy anchor in order to prevent damage to the decoys and anchor lines.

U.S. Pat. No. 1,923,442, does describe one viable solution to the anchor containment problem. The anchor is contained within the decoy for storage and requires several steps to ready the decoy for use. The decoy comes apart during completion of these steps complicating its assembly. It thus lacks functionality and has not been utilized in production decoys.

U.S. Pat. No. 1,951,429 describes an anchor line storage, reel mechanism. The anchor is pulled into the rear portion of the decoy for storage. The problem is the decoy must float backwards since no anchor line attachment is provided on the front of the decoy.

U.S. Pat. No. 2,268,963 describes a decoy stabilizer which can hold a decoy anchor. The anchor is externally stored and is subject to dislodgment if the device is thrown or dropped. The design of the anchor requires it to be light in construction to store properly. This will cause problems of maintaining the decoy in one position in windy or rough weather.

U.S. Pat. No. 2,709,866 describes an anchor retaining system utilizing a metal frame which again retains the anchor externally. The device is an add on and not an integral part of the decoy, thereby restricting its use to decoys capable of retaining screws. It is unclear whether a retaining mechanism holds the anchor in position or whether the anchor line does so. If the anchor line retains the anchor it is a disadvantage that requires all the line to be released before the anchor comes free. No obvious method is described to adjust or shorten the anchor line when desired.

U.S. Pat. No. 2,622,360 describes a totally different approach. It uses lugs depending from a flat bottomed decoy containing pin like extensions and retaining rings to hold the plate like weight to the lugs. Depending the anchor from the exterior of the decoy with pins and extensions allows for damage to adjacent decoys. The anchor is also exposed to dislodgment when dropped or banged about if the retaining mechanism fails or is lost.

U.S. Pat. No. 3,149,433 describes an anchor lashed to a decoy by the anchor line which forms a cinch strap. The anchor is retained externally on the back of the decoy. A long pin, retained vertically in the anchor, allows the anchor line to be wrapped around the decoy. The pin and the anchor can both scratch the surface of adjacent decoys. The anchor can scratch or abrade the back of the decoy in the area where it is lashed.

U.S. Pat. No. 3,834,054 also utilizes exterior retention by retaining the resilient appendage to an elongated and bulbous keel. This system has the same failings as that of the system of U.S. Pat. No. 2,622,360.

U.S. Pat. No. 3,930,328, describes a way of adjusting the length of the decoy anchor line which places tension on the anchor line while retaining the decoy anchor. However the anchor is retained on the back of the decoy in such position that it allows damage to both the retaining decoy and adjacent decoys. The retaining loop placed over the tail of the decoy provides minimal retention and may allow for dislodgment of the cord and decoy weight. The required shape of the decoy anchor is very poor when examined from an anchoring or retention standpoint. This system is limited to rigid decoys, eliminating soft or flexible decoys because of the tension placed on the decoy.

U.S. Pat. No. 4,757,630 describes a system which incorporates a removable anchoring system utilizing a reel mechanism for storing the anchor chord and anchor. This is very awkward and cumbersome. As with all mechanical devices its reliability diminishes in freezing weather and it is exposed to rust and corrosion from fresh and sea water. An additional separate container is required to transport these removable storage mechanisms to and from the field. They are heavy and require additional time and energy to assemble afield.

As can be seen from the foregoing, there has not been a simple, efficient, functional decoy anchor storage system developed, as evidenced by the lack of such in either the custom or the production decoys available to consumers today. The present invention provides a solution to this.

SUMMARY OF THE INVENTION

Accordingly, the present invention provides a decoy having an anchor system which stores the decoy anchor within the body of the decoy. The decoy anchor is securely stored when not in use. The parent decoy is protected from breakage and denting because the anchor is securely held within a cavity in the decoy body. This provides the painted surfaces of the parent decoy protection from chipping and cracking by securely holding the anchor in place within a cavity in the decoy body. This also provides adjacent decoys protection from breakage and denting of their surfaces by precluding banging of or with an unsecured anchor. This also provides the painted surfaces of adjacent decoys protection from chipping and cracking. The decoy anchor system of the present invention is a simple, effective, workable anchor system that functions under all weather conditions. It even provides a means of preventing the anchor lines from coming loose and tangling. While the anchor may be intentionally removed from the decoy body, it will not become dislodged when the decoy is thrown or dropped. The decoy and anchor of the present invention is sound in design and construction, has a minimum of components, and minimizes breakage or replacement while providing improved anchoring features.

BRIEF DESCRIPTION OF THE DRAWINGS

Further objects and advantages of my invention will become apparent from reference to the ensuing description taken in conjunction with the accompanying drawings wherein.

DETAILED DESCRIPTION OF THE PREFERRED EMBODIMENTS

Figure 1:
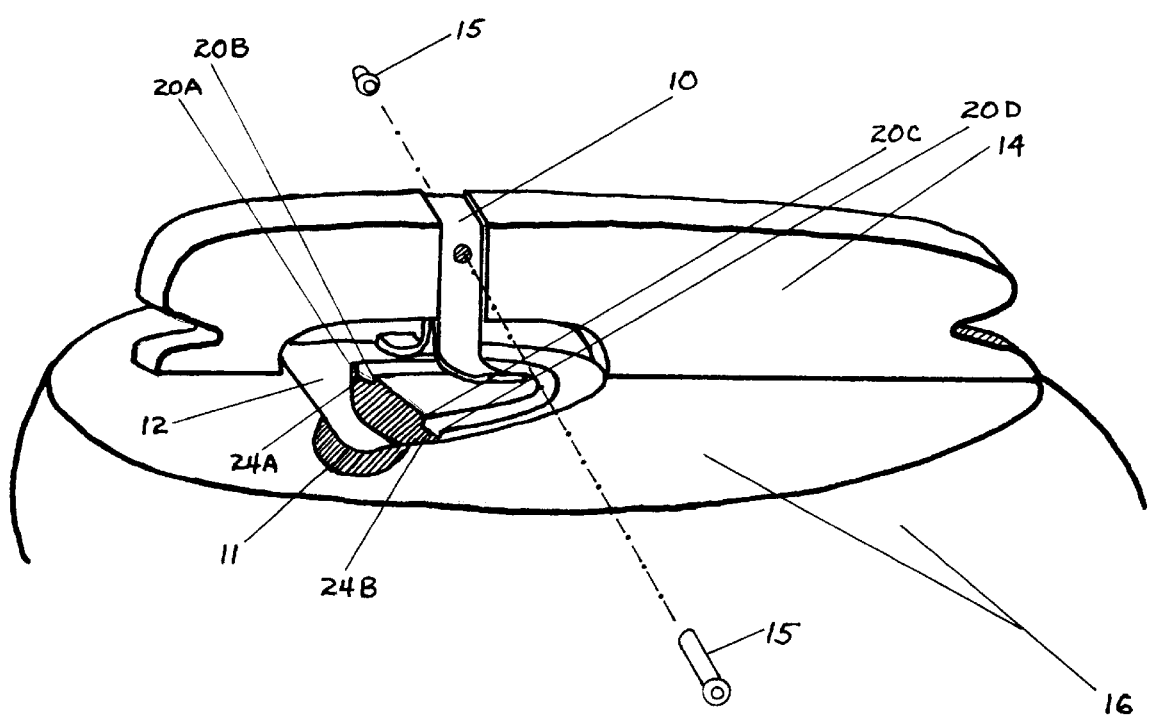
FIG. 1 is a perspective view of a decoy embodying the present invention as viewed from the bottom of the decoy with the decoy turned upside down.
Figure 2:
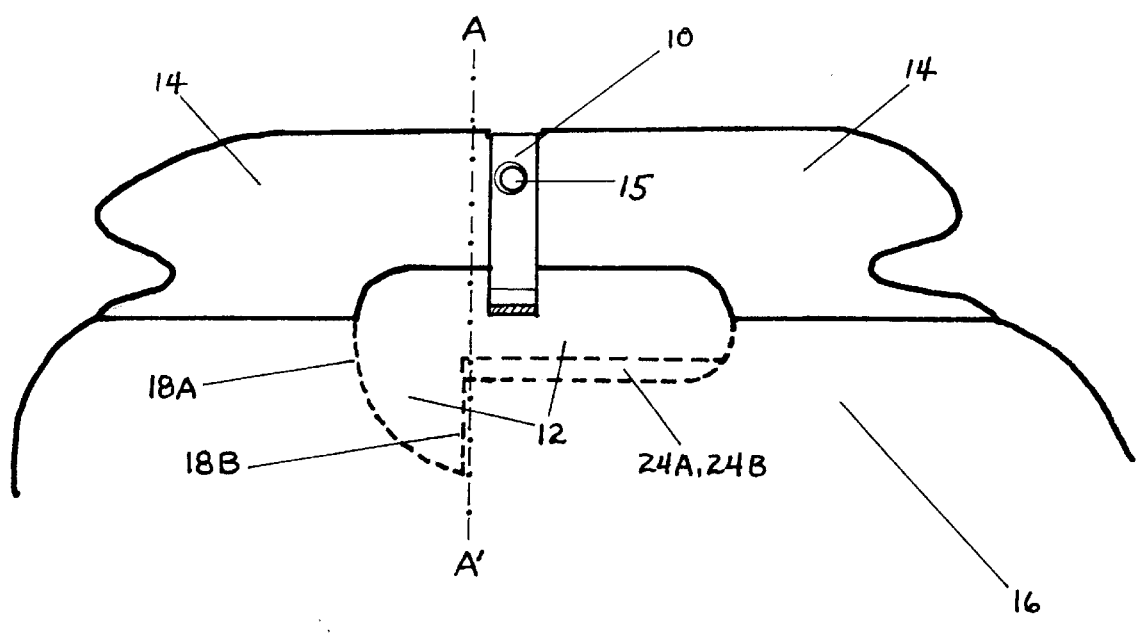
FIG. 2 is a partial side view of the decoy FIG. 1 depicting the storage cavity within the body of the decoy.
Figure 3:
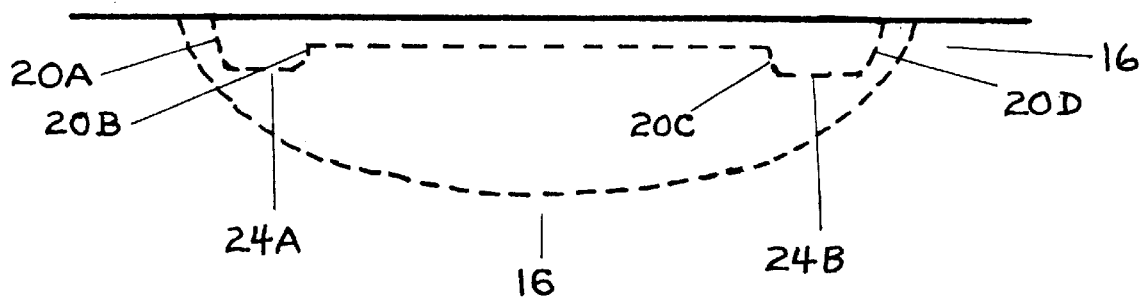
FIG. 3 is a cross sectional view through section A—A as identified in FIG. 2 viewed from a frontal perspective.
Figure 4:
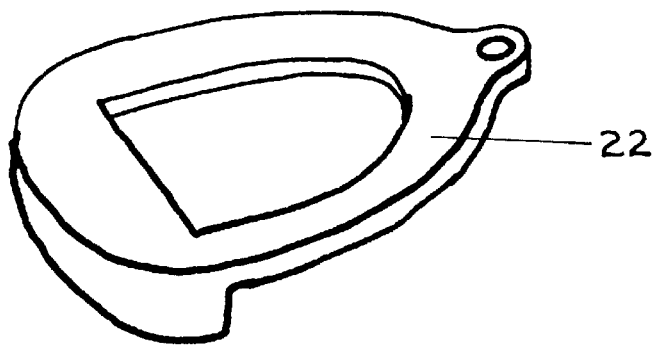
FIG. 4 is a perspective view of a decoy anchor embodying the present invention and which may be utilized with the decoy of FIGS. 1–3.
Figure 5:
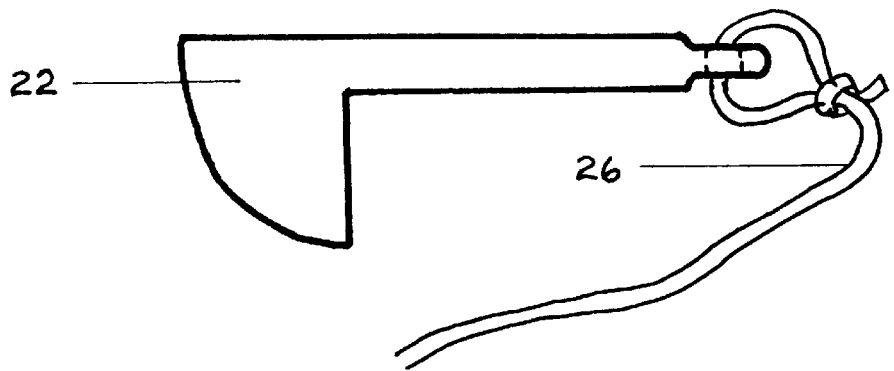
FIG. 5 is a side view of the decoy anchor of FIG. 4.

The following is a list of the reference numerals and corresponding structural elements used in the drawing FIGS. 1–5.
10 Retaining Mechanism
11 Finger Space
12 Storage Cavity
14 Decoy Keel
15 Pop Rivet
16 Decoy Body
18 A Vertical Wall
18 B Vertical Wall
20 A Vertical Wall
20 B Vertical Wall
20 C Vertical Wall
20 D Vertical Wall
22 Decoy Anchor
24 A Recessed Channel
24 B Recessed Channel
26 Anchor Line Referring to FIG. 1, it shows a perspective view of a preferred embodiment of the present invention. An irregularly shaped concave storage cavity 12 is contained within the decoy body 16 and is of such configuration as to adequately contain the decoy anchor 22 (FIGS. 4 and 5). The storage cavity 12 may vary in size and shape as is required by the shape and size of the anchor 22. The shape of the anchor 22 permits superior retention qualities within the storage cavity 12 as described subsequently and improved holding qualities on lake and riverbottoms.

The shape of the storage cavity 12 includes or allows for finger space 11 in order to permit the convenient placement and removal of the anchor 22 from the storage cavity 12. The design of the storage cavity 12 is such that any force upon the anchor 22 other than that designed for its intentional removal, causes the anchor 22 to bind between the walls of the storage cavity 12 and the retaining mechanism 10 thus preventing accidental removal of the anchor 22.

The retaining mechanism 10 is mounted on the decoy keel 14 in this illustration of the preferred embodiment but it may be mounted in other positions as desired. The retaining mechanism 10 deforms as the anchor 22 is placed into the storage cavity 12 producing tension thus holding the anchor 22 firmly in position within the storage cavity 12.

The anchor 22 fits into an annular recessed channel 24A and 24B within the storage cavity 12. The recessed channel includes vertical walls 20A, 20B, 20C, and 20D. The storage cavity 12 includes vertical walls 18A, and 18B as well.

Vertical walls 18A, 18B, 20A, 20B, 20C, and 20D require the anchor 22 to first move vertically in order to be removed from the storage cavity 12. The retaining mechanism 10 resists this vertical movement.

Vertical walls 18A and 18B as best seen in FIG. 2 and vertical walls 20A, 20B, 20C, and 20D as best seen in FIG. 3 are designed to coact with anchor 22 to resist horizontal movement. Vertical wall 18A resists movement of the anchor 22 in a forward direction. Vertical wall 18B resists movement of the anchor 22 in a backward direction. Vertical walls 20A, 20B, 20C, and 20D resist movement of anchor 22 in a sideways direction.

The presence of finger space 11 allows intentional vertical movement to be initiated when intentional removal is desired. Correct adjustment of the length of anchor line 26 and its storage by wrapping it around keel 14 causes anchor 22 to be held taut against vertical wall 18B. Anchor line 26 is at the same time held taut preventing it from unwrapping from keel 14 and tangling with other anchor lines. Thus the anchor 22 is firmly retained within the cavity until it is intentionally removed.

Thus it can be readily seen that the decoy and anchor of the present invention provides an effective, simple workable anchor system that performs well in a variety of weather conditions. Other embodiments of this invention are possible and while the embodiment described herein is an application to a waterfowl decoy, it is not limited to nor intended to be limited to this application. The above description should not therefore be construed as limiting the scope of the invention, but rather as an exemplification of one preferred embodiment thereof. Many other variations are possible. For example applications of the present invention could be found in other floating devices such as navigational buoys, crab pots, lobster pots, float planes, or boats. The present invention could also apply to non floating devices, such as land based airplanes or hot air balloons. Accordingly, the scope of the invention should be determined not by the embodiment illustrated, but by the true spirit and scope of the appended claims.

I claim:
1. A decoy comprising:
a body having an exterior bottom surface, the body having a cavity communicating with the exterior bottom surfaces;
an anchor dimensioned to be received within the cavity;
a keel extending from the bottom surface and bridging the cavity; and
retaining means fixed to the keel adjacent to the cavity, the retaining means being configured to engage the anchor for holding the anchor within the cavity and formed of deformable material to permit the anchor to be removed from the cavity.

* * * * *